No. 857,588. PATENTED JUNE 25, 1907.
J. M. BOYLE.
APPARATUS FOR AND METHOD OF CONTINUOUSLY MAKING MONOLITHIC HOLLOW OBJECTS.
APPLICATION FILED FEB. 20, 1907.
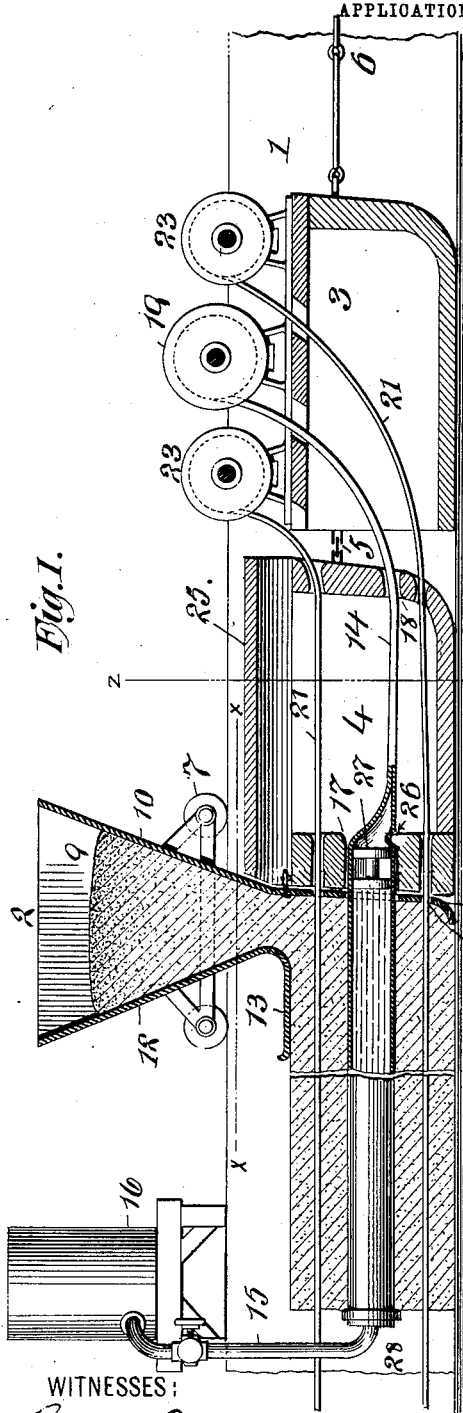
WITNESSES:
Gustave Dieterich
Edwin F. Dieterich
INVENTOR
James M. Boyle
BY Park Benjamin
his
ATTORNEY

UNITED STATES PATENT OFFICE.

JAMES M. BOYLE, OF NEW YORK, N. Y., ASSIGNOR TO MONOLITHIC DUCT COMPANY, A CORPORATION OF NEW YORK.

APPARATUS FOR AND METHOD OF CONTINUOUSLY MAKING MONOLITHIC HOLLOW OBJECTS.

No. 857,588.      Specification of Letters Patent.      Patented June 25, 1907.

Application filed February 20, 1907. Serial No. 358,427.

*To all whom it may concern:*

Be it known that I, JAMES M. BOYLE, a citizen of the United States, residing at New York, in the county of New York and State of New York, have invented a certain new and useful Improvement in Apparatus for and Method of Continuously Making Monolithic Hollow Objects, of which the following is a specification.

The invention relates to continuous monolithic conduits, and consists in means, as hereinafter set forth, for continuously making said conduit of plastic material capable of hardening on setting, and simultaneously embedding therein a removable core and also, if desired, bars, strips or wires of reinforcing material.

The invention further consists in the method of and apparatus for producing said conduits in a simultaneously formed earth mold or trench.

In the accompanying drawing—Figure 1 is a vertical section of the apparatus in place in an open mold or trench, on the line y. y. of Fig. 3. Fig. 2 is a top view with the receptacle 2 in section on the line x x of Fig. 1. Fig. 3 is a cross section on the line z z of Fig. 1.

Similar numbers of reference indicate like parts.

The conduit may be made directly in the trench 1, but preferably in an earth mold formed therein, in the manner hereinafter described. The apparatus, as herein illustrated, includes first, a receptacle 2 into which the plastic material is constantly shoveled, and which travels along the trench; second, a support 3 which travels in the trench and carries the conduit core and reinforcing strips on suitable reels; and third, a guide and mold former 4, which leads the core and reinforcing strips to the receptacle 2 and also forms the sides of the earth mold. These three parts, receptacle 2, support 3 and former 4 are connected by any suitable couplings 5, and are moved continuously forward in the trench by any suitable means, as for example, a chain 6 connected to support 3 and carried to any suitable stationary winding device, not shown.

The receptacle 2 is mounted on trucks 7, which run on the edges of the trench, and has a hopper 9, the front wall 10 of which extends to the bottom of the trench. At its lower edge, said wall is turned rearwardly for a short distance, as shown at 11. Said edge is rounded so as to smooth the bottom of the trench as the receptacle moves forward. The rear wall 12 of the hopper is flanged rearwardly at 13. The height of the horizontal flange 13 above the bottom of the trench determines the vertical thickness of the conduit and the lower face of said flange serves to smooth the upper surface of the plastic mass as the receptacle 2 moves ahead. The rear edge of flange 13 is preferably curved upwardly.

In the front wall 10 is an opening to receive the flexible distensible core 14. One end of said core is secured in place in any suitable way and communicates by pipe 15 with any suitable source 16 of fluid under pressure. After passing through the guide openings 17 and 18 in the front and rear walls of former 4, said core is coiled on a reel 19, mounted on the platform of support 3. Also in the front wall 10 of receptacle 2 are openings 20, through which pass bars, strips or wires 21 of reinforcing material, such as iron or steel. Said bars are to be flexible, so that after passing through guide openings in the walls of former 4 they may be wound on reels 23, also on support 3.

Support 3 is of any suitable sled like construction and has its platform large enough to carry the several reels 23 and 19, for the reinforcing bars and core. Said platform has openings to permit said core and bars to pass down through it to the open rear end of the support and so to the guide openings in the front wall of former 4. Former 4, also of any suitable sled-like construction has a roof or cover 25, with inclined sides. In the opening 17 in its rear wall, through which the core 14 passes, it has a projection which forms a constriction 26 in said core. In the core is a double piston 27, which is movable therein, and which as shown, in Fig. 1, bears against said core constriction.

The operation of the device is as follows: The receptacle 2 is disposed at the end of the trench from which work is to begin. The piston 27 is inserted in the flexible core, by removing the plug which closes the extremity 28 and said extremity is then again closed.

Fluid pressure is then turned on from the source 16. This drives the piston through the core until it reaches the constriction 26. In this way the length of core between said constriction and reel 19 is sealed and remains in deflated condition, while only the embedded portion of the core is distended. Earth is shoveled down upon the roof or cover of former, 4, and is guided by the sloping sides 22 of said roof into the spaces 29 between the smooth vertical sides 30 of former 4 and the vertical sides of the trench. As it enters said spaces it is to be packed or tamped down by any suitable means. In this way an earth mold is continuously produced for the reception of the deposited plastic material, the sides being formed straight and true by the sides 22 of former 4, and the bottom leveled by the passage over it of the former 4, support 3 and turned flange 11 on wall 10 of the receptacle 2. Power is now applied to chain 6 and the whole apparatus is drawn forward. As soon as the receptacle 2 arrives between the layers of tamped earth, shoveling of plastic material into hopper 9 begins. Said material then rises in the trench to the upper flange 13. As the apparatus moves onward the shoveling and tamping of earth into the spaces 29 goes on continuously and so also does the shoveling of plastic material into the hopper. The piston 27 follows the constriction in the core and thus maintains the seal between the distended and non-distended portions thereof. The core and reinforcing bars are continuously paid off the reels 19 and 23 and remain embedded in the plastic mass behind the receptacle 2. After the desired length of conduit is completed, the piston is removed from the core and the core emptied of its distending fluid and removed.

It will be apparent that by this apparatus I can continuously make monolithic conduits of any length, containing, if desired, reinforcing bars or strips, in an ordinary earth trench.

I claim:—

1. A receptacle movable along the length of an earth trench for continuously depositing plastic material therein and a former having smooth vertical sides and disposed in advance of and movable with said depositing receptacle; the said former being constructed of less width than said trench to provide a molding space on each side of said former and between said former and the trench walls for the reception of earth.

2. A receptacle movable along the length of an earth trench for continuously depositing plastic material therein, a former having smooth vertical sides and a roof or cover sloping to said sides: the said former being disposed in advance of and movable with said receptacle and being constructed of less width than said trench to produce a molding space on each side of said former and between said former and the trench walls for the reception of earth.

3. A device for supporting and paying out a flexible core in a previously formed open earth trench of trough shaped cross section, a device including a guide for said core as it is paid out and smooth vertical side walls for smoothing the vertical sides of said trench and a device for continuously depositing plastic material in said trench and in contact with the smoothed sides thereof to embed said core, the said devices being connected together and advanced in the trench in the order named, and means for continuously moving said devices along the length of said trench.

4. In combination with a stationary open mold, a device for paying out a flexible core into said mold, a device for depositing plastic material in said mold to embed said core and means for continuously moving said devices along the length of said mold.

5. In combination with a stationary open mold, a device for paying out a flexible core into said mold, a device for paying out a flexible strip of reinforcing material into said mold, a device for depositing plastic material in said mold to embed said core and strip and means for continuously moving said devices along the length of said mold.

6. In combination with a stationary open mold, a device for paying out a flexible core into said mold, a device for depositing plastic material in said mold to embed said core, a guide for said core interposed between the said devices, and means for continuously moving said devices and guide along the length of said mold.

7. In combination with an open mold, means movable along the length of said mold for continuously paying out into said mold a flexible core, and means also movable along the length of said mold for depositing material therein to embed said core.

8. In combination with an open mold, means for continuously paying out into said mold a flexible core, means for continuously paying out into said mold a flexible strip of reinforcing material and means for continuously depositing in said mold plastic material to embed said core and strip; all of said means being movable along the length of said mold.

9. In combination with an open mold, means for continuously paying out into said mold a flexible core, means for continuously depositing in said mold plastic material to embed said core, and means, interposed between said paying out means and said depositing means, for guiding said core: all of said means being movable along the length of said mold.

10. In combination with a stationary open mold, a support means for moving said support continuously along the length of said mold, a flexible core in coil form having one extremity secured at the end of said mold, a reel on said support carrying said coil, and a device also movable along the length of said mold for continuously depositing plastic material in said mold to embed said core, as said core is paid out from said reel.

11. In combination with a stationary open mold, a device for laying a flexible distensible core therein, a device for depositing plastic material in said mold to embed said core, means for continuously moving said devices along the length of said mold, and means for distending the embedded portion of said core by internal fluid pressure.

12. In combination with a stationary open mold, a device for laying a flexible distensible core therein, a device for depositing plastic material in said mold to embed said core, means for continuously moving said devices along the length of said mold, means for distending said core by internal fluid pressure and means for limiting the length of said core so distended to the embedded portion thereof.

13. In combination with a stationary open mold, a device for paying out a flexible distensible core into said mold, a device for depositing plastic material in said mold to embed said core, means for supplying fluid under pressure to the paid out end of said core, a traveling seal interposed between said paying out device and said depositing device and means for continuously moving said devices along the length of said mold.

14. In combination with a stationary open mold, a support means for continuously moving said support along the length of said mold, a flexible distensible core in coil form carried by said support, having one extremity secured at the end of said mold, means for admitting fluid under pressure to said core at said secured end, a piston in said core, a device for continuously depositing plastic material in said mold to embed said core and means for producing a traveling constriction in said core in advance of said piston.

15. The method of continuously producing in a trench, an open earth mold for a continuous monolithic conduit, which consists in causing said trench to be traversed in advance of the means for depositing the plastic material to be embedded by a former of less width than said trench and having smooth vertical sides, and continuously packing earth in the spaces between the sides of said former and the sides of said trench to form the smooth vertical sides of said mold.

In testimony whereof I have affixed my signature in presence of two witnesses.

JAMES M. BOYLE.

Witnesses:
WM. H. SIEGMAN,
GERTRUDE T. PORTER.